Jan. 28, 1930. A. BOIDIN ET AL 1,744,742
METHOD OF PRODUCING BACTERIAL ENZYME PREPARATIONS
Filed June 28, 1923 2 Sheets-Sheet 1
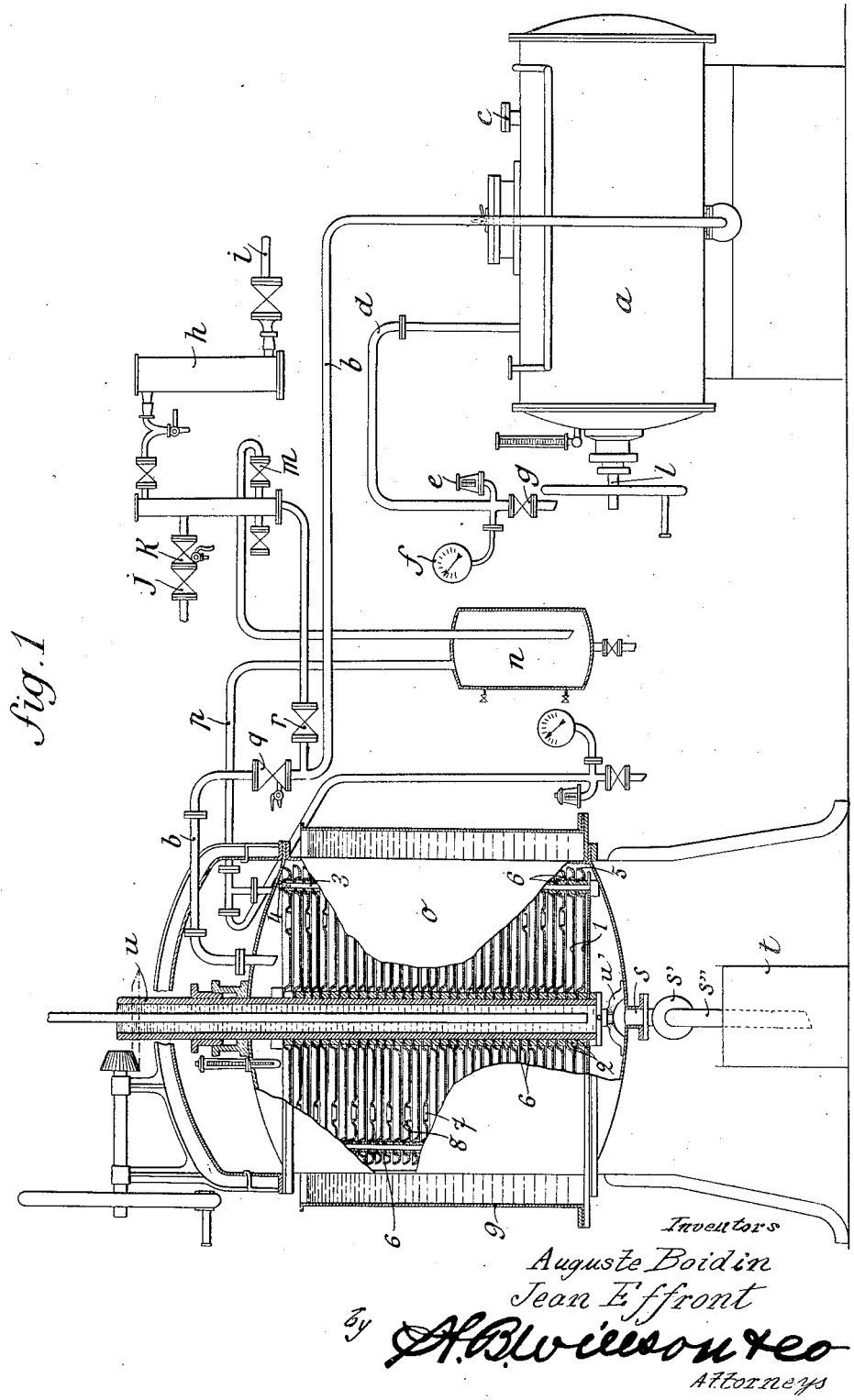
Inventors
Auguste Boidin
Jean Effront
by H.B.Willson&co
Attorneys

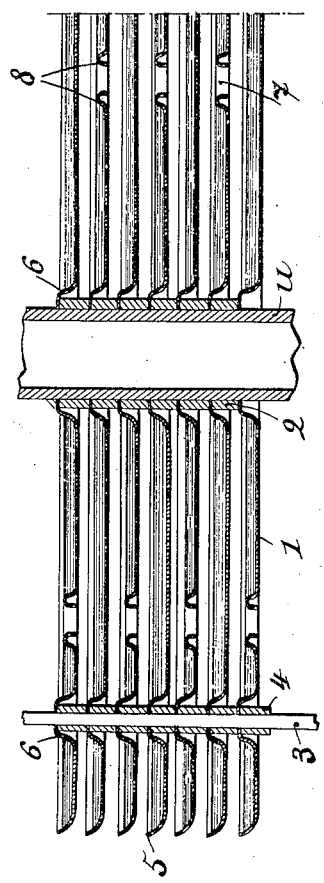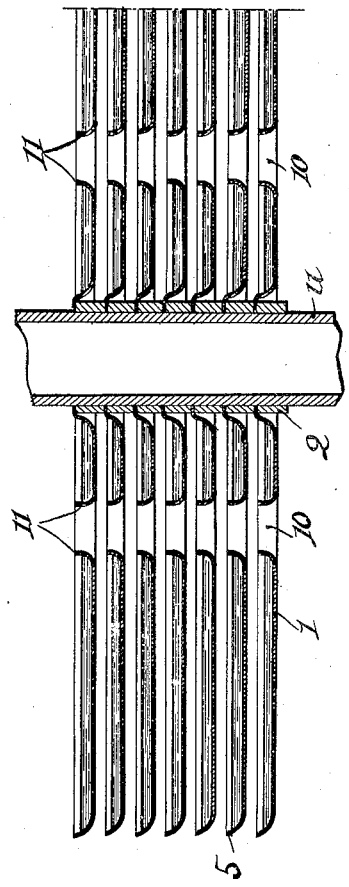

Patented Jan. 28, 1930

1,744,742

UNITED STATES PATENT OFFICE

AUGUSTE BOIDIN, OF SECLIN, FRANCE, AND JEAN EFFRONT, OF BRUSSELS, BELGIUM

METHOD OF PRODUCING BACTERIAL ENZYME PREPARATIONS

Application filed June 28, 1923, Serial No. 648,381, and in France July 3, 1922.

Our invention relates to improvements in the process and apparatus described in Patent No. 1,227,525 dated July 6, 1914, for augmenting the yield and the quality of enzymes produced by aerobic micro-organisms. The said improvements comprise various means which are effective when used separately and produce the maximum effect when simultaneously employed.

These advantages are obtained by filtration of the culture medium and by the use of a medium which may be rich in inorganic nitrogen and relatively poor in organic nitrogen if it contains or if there is added thereto a sufficient quantity of oxyacid salts to maintain in an alkaline solution small quantities of manganese and iron salts even when the wort is alkaline.

The process in accordance with said patent is based upon the use of thick or turbid soja worts, but for this we substitute a process using clear worts which comprises a treatment to peptonize the wort, after which the wort is filtered. The wort may be peptonized by any of the well-known methods as, for example, by treatment with a small amount of proteolytic bacteria, as set forth in our Patent No. 1,509,467. The said filtration produces excellent results, for it renders the culture medium more homogeneous and facilitates the aerobic life of the micro-organisms. In the said turbid wort, the insoluble refuse substance act to maintain a part of the bacteria in the submerged state and hence under conditions of anaerobic life, but on the contrary with the clear wort all the bacteria can rise to the surface and live in contact with air.

As stated in our aforesaid Patent No. 1,227,525, bacteria growing near the surface of a thick or turbid wort in contact with air will render the culture medium alkaline; but bacteria at some depth in such wort act to produce an undesirable acid condition, and the bacteria growing under these different conditions in effect oppose each other and lessen the production of the desired enzymes and this difficulty is overcome by the use of a filtered wort, in accordance wtih our invention.

For the nitrogeneous aliment, use can be made of widely varying products such as albumens, albumoses, peptones, or amino acids, these being produced preferably by hydrolysis of animal or vegetable residues according to the known methods. It is necessary that this hydrolysis should not be carried so far as to make it possible or difficult to hold in solution in an alkaline culture medium the inorganic salts of iron, manganese, and calcium which are essential for a strong cultivation of the microbe and an abundant secretion of enzymes of an amylolytic or proteolytic nature. Use can also be made of proteins in a substantially hydrolized condition, and even of ammonium salts, by adding to the culture medium oxyacid salts which act in the same manner as oxyacid salts which are probably formed during the hydrolysis of the protein containing substances before referred to and which have the property of maintaining in alkaline solution the mineral salts which are indispensable for the proper growth of the bacteria, according to our process.

If the process is to be carried out by use of ammoniacal salts to which oxyacid salts are added, carbon should be supplied in the form of sugar, dextrine or other carbohydrates.

When utilizing the proteins, this addition of sugar or carbohydrates is not necessary because in this case the microbes find the necessary carbon in the products derived from the hydrolized albumens.

Below is a formula, given by way of example, of a composition forming a culture medium of the mineral type which is capable of causing the production of enzymes of a superior quality when used as a culture medium for bacteria or mucedinaceæ.

| | |
|---|---|
| Potassium chloride | 1,50 |
| Sodium chloride | 0,50 |
| Potassium sulphate | 0,50 |
| Calcium tartrate or citrate | 3 to 10 |
| Magnesium tartrate or citrate | 3 to 10 |
| Potassium or sodium phosphate | 3 to 15 |
| Ammonium carbonate | 0,50 |
| Sulphate of iron | 0,10 |
| Sulphate of manganese | 0,10 |
| Sulphate of ammonium | 5 to 15 |
| Glucose or starch | 25 to 35 | and water to make a litre of the composition.

A medium of this or analogous character which is obtained by varying the quantities of the different components is capable of producing, with suitable bacteria, enzymes of a powerful nature which operate efficiently at high temperatures of 85 to 90 degrees C. or the like. For this reason they are to be considered as superior products for use in the textile industry for the removal of size, and further, if care is taken to effect the separate sterilization of the glucose—which gives caramel in an alkaline medium—the process will provide substantially colorless enzyme preparations which are much valued in the scouring industry and for removal of emulsion of photographic films. These light colored enzyme preparations can also be used for the manufacture of carbohydrates of the dextrine class which have an absolutely white color.

Instead of using a medium which is almost largely inorganic, as above stated by way of example, use may further be made of the juices of plants, preference being given to the alkaline juices, such as may be afforded by the juice of potatoes, because such juices always contain oxyacid salts in sufficient amount to solubilize all the inorganic salts which are necessary to insure a great vitality of the micro-organisms. It has in fact been ascertained that a given volume of potato juice freed from its albumen by a peptonizing treatment such as described in our Patent No. 1,509,467 and rendered alkaline is capable of dissolving one-half of its volume of a manganese sulphate solution containing one-tenth of a mole of sulphate per litre; so that the said juice has the same dissolving power as a one-tenth molal solution of ammonium citrate. All natural or artificial juices which are enabled to dissolve manganous or manganic oxide will constitute a superior raw material for the preparation of enzymes; it is simply necessary to augment the nutritive character as far as possible by adding alkaline phosphates and ammoniacal salts.

If dissolved proteins are to be employed, the operation may be carried out as follows:

To 3,000 kilograms of water we gradually add, while mixing, 1,000 kilograms of pressed peanut oil cake which have been treated by a small amount of proteolytic bacteria as set forth in our Patent No. 1,509,467 dated September 23, 1924.

The mash seeded by this proteolytic microbe is maintained for 20 to 36 hours at a temperature of about 55 to 60° centigrade. This mash may also be treated by proteolytic enzymes of any character; pepsin, pancreatin, papain, etc. or also by dilute acids. When using enzymes the temperature may be lowered to 50° to 55° centigrade and the dissolution is terminated in 6 to 12 hours according to the activity of the enzymes employed. This solution of scarcely hydrolyzed albumens may also be obtained by boiling the mash of molded peanut cake and water with dilute acids, for instance with 6 to 8 parts of sulfuric acid per 100 parts of cake, raising the temperature slowly and keeping the boiling point for 2 hours or a little longer. As soon as the peptonizing action is sufficient, that is to say when the proportion of soluble nitrogen no longer increases, the mash is filtered neutralized and if desired made slightly alkaline. This extraction of nitrogenous matter may be effected in several operations, thus dissolving more or less of the proteins.

The filtered and neutralized wort is cooled and is then seeded with a culture comprising a micro-organism as for instance bacteria of the genus subtilis or mesentericus adapted to produce the desired enzymes, and the wort is then conveyed in an aseptic manner into culture apparatus as set forth in Patent No. 1,227,525 or preferably into the improved apparatus to be further described.

A form of construction of said improved apparatus is illustrated in the appended drawings by way of example.

Fig. 1 is a general elevational view of the apparatus, with certain parts in section.

Figs. 2 and 3 are partial vertical sections on a larger scale, taken on two perpendicular planes.

$a$ indicates a sterilizing digester which is provided with a steam pipe $b$, a tube $c$ on which is mounted the seeding cock, a conduit $d$ provided with the safety valve $e$, a pressure gauge $f$, an emptying cock $g$, and a stirring device with handle $l$. $h$ indicates a filter made of wadding such as absorbent cotton, which renders aseptic the air which is admitted under pressure at $i$; steam is admitted by the cocks $j, k$. At $m$ is a cock which can introduce steam and then pure air, and it communicates with the air-moistening device $n$ and the culture apparatus $o$; the latter comprises a vessel of aluminium or like material which can be sterilized at a pressure of 1 kilogram per sq. cm.; the said vessel has at the top a conduit communicating with the feed pipe $b$, as well as an air inlet tube $p$ and a conduit upon which is disposed the safety valve and the pressure gauge. At the bottom of the vessel is disposed a pipe provided with the cock s and immerged in a water tank t.

A shaft u, coaxial with the vessel o, extends through a stuffing box and can be rotated by gearing and a flywheel carrying a handle, the lower end being mounted in a step bearing u'. The said shaft carries a set of disks 1 spaced apart by braces 2 and held together by vertical rods 3 and nuts 4. Each disk comprises a flange 5 at the periphery and the flanges 6 cooperating with the apertures through which the said shaft and the rods 3 are caused to extend. The said disk has formed therein an aperture 7 provided with a flanged edge which is lower than the edges 5 and 6 and allowing the overflow of the disk to run upon the succeeding disk; the overflow apertures in the successive discs are staggered in diametral position. The general arrangement of the said apparatus is known per se, but certain modifications have been made because the turbid wort has been replaced by filtered juices. The bacteria are provided with an assimilable sustenance and will thus operate more rapidly, and the mass has a tendency to become heated to a much greater degree than with the turbid wort, so that it would be an easy matter for the temperature to suddenly attain 45—47 degrees C. which would have a most prejudicial effect upon the vitality of the micro-organisms. To maintain the wort within the limits of the most desirable temperature, we augment the height of the flanges of the said disks so as to substantially double the layer of liquid; further, the fermenting liquid is cooled by disposing at the center a hollow shaft u instead of a solid shaft. By means of a stream of water of variable force according to needs, we maintain the temperature at the degree which is chosen with reference to the bacteria employed.

It is a difficult operation to filter the turbid peptonized worts after fermentation, and this causes the loss of 35 per cent of the volume of the resulting enzyme, but in our process it is much easier to filter the worts.

To obtain fermentations which are more quiet and regular, it is advisable to seed with bacterial cultures which are prepared at a constant temperature and with a moderate aeration, the growth of the same being moderate, so that the bacteria used for seeding are substantially in the form of spores. In such conditions, a moderate temperature can be used, and the amount of wort fermented in a given apparatus can be augmented.

Claims:

1. The process of manufacturing bacterial enzyme preparations for industrial uses, which comprises acting on an alkaline, nutritive sterilized and filtered medium, rich in assimilable nitrogenous matters and contaning small amounts of iron and manganese salts in solution after sterilization, with culture of aerobic bacteria capable of secreting the enzymes substantially as described.

2. In the process of manufacturing bacterial enzymes for industrial uses, the step comprising the addition of an organic hydroxy-acid salt to filtered wort containing inorganic salts comprising iron and manganese in order to hold in the solution the said inorganic salts.

3. In the process of manufacturing bacterial enzymes for industrial uses, the step which comprises acting on a sterilized and filtered medium containing more than a trace of an ammonium salt, small amounts of iron and manganese salts, an organic carbohydrate suitable to sustain bacterial growth and a hydroxyacid salt, with aerobic bacteria capable of secreting the desired enzymes substantially as described.

4. In the process of manufacturing bacterial enzymes for industrial uses, the step which comprises acting on a sterilized and filtered nutritive wort, containing vegetable juice rich in proteins and having salts of an organic hydroxyacid, to which small amounts of iron and manganese salts are added, with aerobic bacteria capable of secreting the enzymes substantially as described.

5. In the process of manufacturing bacterial enzymes for proteolytic and amylolytic industrial uses, the steps comprising cultivating an aerobic bacteria capable of secreting the required enzymes on a culture medium nutritive for such bacteria, maintaining a substantially constant temperature, aerating the culture to an extent less than required for the maximum growth of the bacteria in order to moderate the rate of growth of said bacteria, and then inoculating, with the culture thus developed, a filtered wort containing in solution small amounts of iron and manganese salts and nutritive for said bacteria.

6. In the process of manfacturing bacterial enzymes for proteolytic and amylolytic industrial uses, the steps comprising cultivating an aerobic bacteria capable of secreting the required enzymes on a culture medium nutritive for such bacteria, maintaining a substantialy constant temperature, aerating the culture to an extent less than required for the maximum growth of the bacterial in order to moderate the rate of growth of said bacteria, and when substantial sporulation has taken place, inoculating a filtered wort containing in solution small amounts of iron and manganese salts and nutritive for said bacteria with the culture thus developed, and allowing the bacteria to develop further in said wort until the latter contains the desired amount of enzymes.

In testimony that we claim the foregoing as our invention we have signed our names.

AUGUSTE BOIDIN.
JEAN EFFRONT.